United States Patent
Burgess

(10) Patent No.: US 11,099,848 B1
(45) Date of Patent: Aug. 24, 2021

(54) OVERLAPPED-IMMEDIATE/REGISTER-FIELD-SPECIFYING INSTRUCTION

(71) Applicant: Arm Limited, Cambridge (GB)

(72) Inventor: Neil Burgess, Cardiff (GB)

(73) Assignee: Arm Limited, Cambridge (GB)

( * ) Notice: Subject to any disclaimer, the term of this patent is extended or adjusted under 35 U.S.C. 154(b) by 29 days.

(21) Appl. No.: 16/776,730

(22) Filed: Jan. 30, 2020

(51) Int. Cl.
*G06F 9/30* (2018.01)

(52) U.S. Cl.
CPC .......... *G06F 9/3016* (2013.01); *G06F 9/3013* (2013.01)

(58) Field of Classification Search
None
See application file for complete search history.

(56) References Cited

U.S. PATENT DOCUMENTS

| | | | | |
|---|---|---|---|---|
| 2007/0271441 A1* | 11/2007 | Shaw | .................... | G06F 9/3861 712/41 |
| 2013/0305020 A1* | 11/2013 | Valentine | ............ | G06F 9/30047 712/208 |
| 2019/0018815 A1* | 1/2019 | Fleming | ................ | G06F 13/423 |

OTHER PUBLICATIONS

Robert Bedichek, "Some Efficient Architecture Simulation Techniques," Proceedmgs of the Winter 1990 USENIX Conference, Jan. 22-26, 1990, 12 pages.

* cited by examiner

*Primary Examiner* — Michael Sun
(74) *Attorney, Agent, or Firm* — Nixon & Vanderhye P.C.

(57) ABSTRACT

An apparatus comprises: processing circuitry, an instruction decoder, and registers. In response to an overlapped-immediate/register-field-specifying (OIRFS) instruction comprising an opcode field specifying an OIRFS-indicating opcode value, and an overlapped immediate/register field specifying an immediate value and a register specifier, the instruction decoder controls the processing circuitry to use a selected register of the plurality of registers corresponding to the register specifier as a source register or destination register when performing a processing operation depending on the immediate value. The overlapped immediate/register field includes at least one shared bit decoded as part of the immediate value for at least one encoding of the OIRFS instruction and decoded as part of the register specifier for at least one encoding of the OIRFS instruction.

16 Claims, 5 Drawing Sheets

OVERLAPPED-IMMEDIATE/REGISTER-FIELD-SPECIFYING INSTRUCTION

BACKGROUND

Technical Field

The present technique relates to the field of data processing.

TECHNICAL BACKGROUND

A data processing apparatus has processing circuitry to perform data processing in response to instructions decoded by an instruction decoder. The format of the instruction encoding and the functionality represented by each instruction may be defined according to an instruction set architecture (ISA). The ISA represents the agreed framework between the hardware manufacturer who manufactures the processing hardware for a given processor implementation and the software developer who writes code to execute on that hardware, so that code written according to the ISA will function correctly on hardware supporting ISA.

When designing an ISA, there can be a significant design challenge in determining the set of processing operations to be supported in the ISA and the encoding of the instructions to represent those operations. In principle there may be a wide variety of different types of processing operation which may be useful to the support for some program applications, but within the encoding space available it may not be possible to represent every possible data processing operation which could be useful to a particular programmer. There may be a restriction on the number of bits available for encoding each instruction, because increasing the instruction bit width would incur additional circuit area and power consumption each time the instruction is stored anywhere within the processor or is transferred over wired processing paths between logic elements. To limit hardware and power costs, an instruction bit width may be selected which, when taking account of the need to encode operand values through register specifiers and/or immediate values, leaves an opcode space which is insufficient to represent every possible data processing operation which could be desired. Therefore, a design decision would need to be made as to which subset of operations are the most important to support, and any operations which cannot be supported in a single instruction would then have to be performed using sets of multiple instructions with equivalent functionality when executed together. Hence, the design decisions made by the ISA designer when planning the instruction encoding of the ISA may have a significant effect on the real world performance achieved by processing hardware when executing a particular program, depending upon whether the instructions are available to support the operations desired.

Therefore, any techniques which can improve the efficiency with which a given set of operations can be represented within the encoding space of the instruction set can be extremely valuable in improving overall performance when that ISA is subsequently implemented on a hardware device. If an encoding efficiency improvement can be provided which allows even a single bit of encoding space to be saved so that it can be reused for other purposes (e.g. providing an additional opcode bit and therefore doubling the number of different processing operations which can be represented), then this will be extremely valuable because the increased number of processing operation types supported can then be exploited by programmers so that more operations can be performed in a single instruction to improve processing performance. Hence, gains in encoding efficiency, even if apparently small and resulting in only a single bit of additional encoding space becoming available, in practice have a massive effect on the performance achieved by processing devices.

SUMMARY

At least some examples provide an apparatus comprising: processing circuitry to perform data processing; an instruction decoder to decode instructions to generate control signals to control the processing circuitry to perform the data processing; and a plurality of registers; in which: in response to an overlapped-immediate/register-field-specifying (OIRFS) instruction comprising an opcode field specifying an OIRFS-indicating opcode value, and an overlapped immediate/register field specifying an immediate value and a register specifier, the instruction decoder is configured to control the processing circuitry to use a selected register of the plurality of registers corresponding to the register specifier as a source register or destination register when performing a processing operation depending on the immediate value; and said overlapped immediate/register field includes at least one shared bit for which: for at least one encoding of the OIRFS instruction having the opcode field specifying said OIRFS-indicating opcode value, the instruction decoder is configured to decode said at least one shared bit as part of the immediate value; and for at least one encoding of the OIRFS instruction having the opcode field specifying said OIRFS-indicating opcode value, the instruction decoder is configured to decode said at least one shared bit as part of the register specifier.

At least some examples provide a data processing method for an apparatus comprising processing circuitry to perform data processing, an instruction decoder to decode instructions to generate control signals to control the processing circuitry to perform the data processing, and a plurality of registers; the method comprising: the instruction decoder decoding an overlapped-immediate/register-field-specifying (OIRFS) instruction comprising an opcode field specifying an OIRFS-indicating opcode value, and an overlapped immediate/register field specifying an immediate value and a register specifier; and in response to the OIRFS instruction, the instruction decoder controlling the processing circuitry to use a selected register of the plurality of registers corresponding to the register specifier as a source register or destination register when performing a processing operation depending on the immediate value; in which: said overlapped immediate/register field includes at least one shared bit for which: for at least one encoding of the OIRFS instruction having the opcode field specifying said OIRFS-indicating opcode value, the instruction decoder decodes said at least one shared bit as part of the immediate value; and for at least one encoding of the OIRFS instruction having the opcode field specifying said OIRFS-indicating opcode value, the instruction decoder decodes said at least one shared bit as part of the register specifier.

At least some examples provide a non-transitory storage medium storing a computer program for controlling a host data processing apparatus to provide an instruction execution environment for execution of instructions of target program code; the computer program comprising: processing program logic to perform data processing; and instruction decoding program logic to decode instructions of the target program code to control the processing program logic to perform the data processing with reference to a register providing data structure representing a plurality of registers; in which: in response to an overlapped-immediate/register-field-specifying (OIRFS) instruction comprising an opcode field specifying an OIRFS-indicating opcode value, and an overlapped immediate/register field specifying an immediate value and a register specifier, the instruction decoding program logic is configured to control the processing program logic to perform a processing operation depending on an immediate value, using a selected register of the plurality of registers corresponding to the register specifier as a source register or destination register; and said overlapped immediate/register field includes at least one shared bit for which: for at least one encoding of the OIRFS instruction having the opcode field specifying said OIRFS-indicating opcode value, the instruction decoding program logic is configured to decode said at least one shared bit as part of the immediate value; and for at least one encoding of the OIRFS instruction having the opcode field specifying said OIRFS-indicating opcode value, the instruction decoding program logic is configured to decode said at least one shared bit as part of the register specifier.

Further aspects, features and advantages of the present technique will be apparent from the following description of examples, which is to be read in conjunction with the accompanying drawings.

DESCRIPTION OF EXAMPLES

Figure 1:
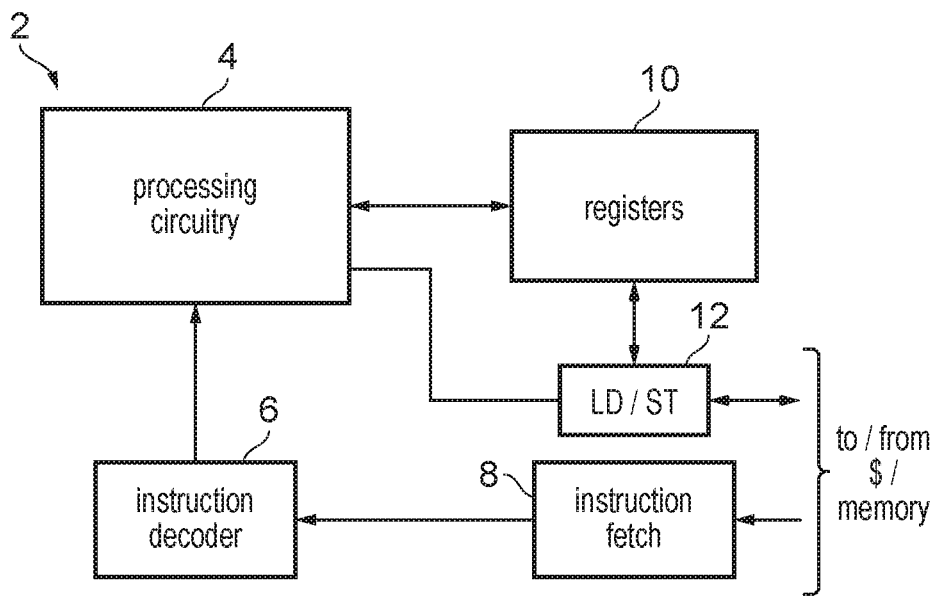
FIG. 1 schematically illustrates an example of a data processing apparatus.

In the techniques discussed below, an overlapped-immediate/register-field-specifying (OIRFS) instruction is provided which comprises an opcode field specifying an OIRFS-indicating-opcode value, and an overlapped immediate/register field specifying an immediate value and a register specifier. The processing apparatus has a register file with a certain number of registers available for selection to serve as source or destination registers for data processing operations. In response to the OIRFS instruction, the instruction decoder controls the processing circuitry to use a selected register of the register file (which corresponds to the register specifier specified by the OIRFS instruction) as either a source register or a destination register, while performing a processing operation which depends on the immediate value. Here, the immediate value is a numeric value specified directly in the instruction encoding, in contrast to register-specified operands where the numeric value to be processed is stored in a register referenced indirectly by the instruction. The immediate value could be used as an operand for the processing operation, or may be a control value or modifier value which modifies the way the processing operation is performed.

For most typical instructions, where an instruction specifies an immediate value and a register specifier, these are normally specified using two distinct non-overlapping fields in the instruction encoding. However, in the techniques discussed below, the overlapped immediate/register field includes at least one shared bit which is shared between representing the immediate value and representing the register specifier. For at least one encoding of the OIRFS instruction having the opcode field which specifies the OIRFS-indicating opcode value, the instruction decoder decodes the at least one shared bit as part of the immediate value. For at least one encoding the OIRFS instruction having the same OIRFS-indicating opcode value in its opcode field, the instruction decoder decodes the at least one shared bit as part of the register specifier. Hence, even for instructions having exactly the same opcode in the opcode field, the shared bit (or bits) can be used either to represent part of the immediate value or to represent part of the register specifier, or to represent part of both the immediate value and the register specifier. Hence, the instruction having the encoding indicating that the shared bit should represent part of the immediate value and the instruction whose encoding indicates that the shared bit should represent part of the register specifier could in some cases be the very same instruction. Alternatively, in some cases, instructions sharing the same opcode field specifying the OIRFS-indicating opcode value, but with different encodings for other parts of the instruction could select whether to use the shared bit as the immediate value only or as the register specifier only. Hence, by sharing the encodings of the immediate value and the register specifier so that at least one bit can be interpreted as either part of the immediate value or part of the register specifier or both, this avoids the need for two distinct bits to represent the corresponding parts of the immediate value and register specifier respectively, and so this may free up at least one bit of encoding space which can be reused for other purposes, such as for increasing the number of different operation types which can be represented in the opcode field, or for adding a further field to indicate another parameter of the instruction. Either way, this additional encoding space freed up by the efficiency saving of overlapping the register specifier and immediate value fields can be extremely valuable and helps to improve performance in a processor for the reasons given above.

In one example, for an encoding of the OIRFS instruction having the opcode field specifying the OIRFS-indicating opcode value, when the immediate value is a first immediate value, the register specifier may specify the selected register as one of a first subset of the two or more registers provided within the register file, while when the immediate value is a second immediate value different to the first immediate value then the register specifier may specify the selected register as one of a second subset of registers different to the first subset. Hence, the sharing of bits between the immediate value and register specifier encodings means that the selection of the immediate value may impose restrictions on which registers are available to be selected as the selected register. This may be counter-intuitive as normally one would expect that there is a free selection of which register can be selected as the selected register irrespective of a value in an immediate field in another part of the instruction. While at first glance limiting the selection of registers to particular subsets of registers may appear counter-productive as it may increase register pressure (leading to more frequent need to spill data from the register file out to memory to make way for other data), any performance lost caused by increased register pressure can be outweighed by the improved performance available by having one or more additional bits of instruction encoding space so that a greater number of different opcodes corresponding to distinct types of processing operation can be supported in the ISA.

In one example, the first and second subsets of registers available for selection by the OIRFS instruction encodings specifying the first and second immediate value respectively may comprise different non-overlapping subsets of the registers. Hence, the OIRFS instruction specifying the first immediate value may be restricted to selecting registers from a first subset of registers and the OIRFS instruction specifying the second immediate value may be restricted to selecting registers from a different subset which does not include any of the registers in the first subset. Hence, when compiling code using the OIRFS instruction a compiler may need to be aware of the immediate value that needs to be encoded in that instruction so that it can make sure that earlier instructions which generate source operands for the OIRFS instruction or later instructions which use the result of the OIRFS instruction reference one of the relevant subset of registers that can be specified by the OIRFS instruction, given the particular immediate value encoded.

Alternatively, in some implementations the first and second subsets may be different overlapping subsets of the registers. In this case, then at least one of the registers may be included in both the first and second subsets. For example the first subset could include all the registers of the second subset and also include at least one register not in the second subset. In some cases, the first subset may include all of the plurality of registers which can be referenced using the register specifier across all possible encodings of the OIRFS instruction. Hence, with this approach then while there may be a wide choice of registers when the OIRFS instruction specifies the first immediate value, there may be a more restricted choice of registers when the immediate value is the second immediate value, so that the number of registers available for selection varies depending upon the particular choice of immediate value made for the instruction.

In one example, in response to the OIRFS instruction, the instruction decoder may decode the at least one shared bit both as part of the immediate value and as part of the register specifier. In other words, with this approach, the effective values represented by the immediate value and register specifier would (if represented using distinct sets of non-overlapping bits) be constrained so that at least one bit of the immediate value always has to have the same bit value as at least one bit of the register specifier. With this approach, at least one register selectable as the selected register for an encoding of the OIRFS instruction specifying a first immediate value may not be selected as the selected register for an encoding of the OIRFS instruction specifying a second immediate value, and vice versa. If the effective immediate value to be represented has A bits and the effective register specifier to be represented has B bits, so that the number of different immediate values that can be encoded is a $2^A$ and the number of different unique register specifiers that can be specified is $2^B$ then when S bits of the immediate and register specifier fields are overlapped the combination of the immediate value and the register specifier may be represented using A+B-S bits, but this imposes restrictions so that there are some valid pairings of immediate value and register specifier which can be represented in the instruction encoding and other invalid pairings of immediate value and register specifier which cannot be represented in the instruction encoding. In this case, for each possible immediate value there may be a set of $2^{(B-S)}$ different registers that can be selected and the subset of registers that can be selected for any given immediate value differs for each immediate value.

Alternatively, in other implementations rather than decoding at least one shared bit of the overlapped immediate/register field as part of both the immediate value and the register specifier, instead the shared bit could selectively be decoded either as part of the immediate value or as part of the register specifier. The selection can be based upon a part of the instruction encoding of the OIRFS instruction other than the opcode field. More particularly, the selection may be based on a part of the instruction encoding other than the opcode field and other than the at least one shared bit of the overlapped immediate/register field. For example, the selection could be based on the at least one non-shared bit of the immediate value which is not used to represent the register specifier for any encoding of the OIRFS instruction. With this approach, the subsets of registers available for selection for different immediate values may overlap. This approach can be useful if the number of distinct unique valid immediate values to be encoded is not an exact power of 2, as this allows the spare encodings of the immediate value to be used to provide an additional register specifier bit which can be interpreted alongside other register specifier bits so as to allow a wider set of registers to be selected for some encodings of the immediate value, to help reduce register pressure and improve encoding efficiency. Hence, with this approach, an encoding of the overlapped immediate/register field may represent the immediate value as one of a set of N unique valid immediate values, where N is an integer other than exact power of 2. In conventional instruction encoding techniques where the immediate value is encoded using a distinct immediate value field separate from any other parameter of the instruction, even if the number of valid values of the immediate value is not a power of 2, the encoding space associated with the remaining encodings of the immediate field would be wasted. The technique discussed above can help reuse those encodings for useful purposes (e.g. allowing additional opcodes or registers to be specified).

With the approach where the instruction decoder selects whether the at least one shared bit is decoded as either the immediate value or the register specifier, then this may allow a first subset of encodings of the OIRFS instruction to encode the overlapped immediate/register field to represent the immediate value as one of a set of J unique valid immediate values and represent the register specifier as one of a set of K unique valid register specifiers, and a second subset of encodings of the OIRFS instructions specifying the same value of the OIRFS-indicating opcode value as the first subset of encodings to represent the overlapped immediate/register field such that the number of unique valid immediate values is L and the number of unique valid register specifiers is M. J may be less than L and K may be greater than M. Hence, there is a trade off between the number of register specifiers and the number of immediate values that can be represented. Some encodings of the OIRFS instruction can represent a larger number of immediate values but a smaller number of register specifiers, while for other encodings having the same opcode value the number of immediate values may be lower but the number of registers specifiers may be higher. This may result in the total number of representable immediate values J+L being a non-power of 2.

The register specifier represented using the overlapped immediate/register field need not be the only register specifier identified by the OIRFS instruction. There may also be a non-overlapped register field which specifies a further register specifier identifying one of the plurality of registers as a further selected register to use as either a source register or a destination register in the processing operation. The non-overlapped register field may be decoded based on non-shared bits of the non-overlapped register field, and need not depend on bits used for the immediate value in any valid encoding of the OIRFS instruction.

The OIRFS instruction may be any instruction which encodes its immediate value and register specifier using the overlapped field as described above. The particular data processing operation performed in response to the OIRFS instruction using the immediate value and the source or destination register selected based on the register specifier can vary considerably. However, regardless of the particular processing operation represented by this instruction, the use of the at least one shared bit as part of the immediate value for some encodings and as part of the register specifier for some encodings (either the same encodings or different encodings) is performed for encodings of the OIRFS instruction which have the same opcode value. Hence those encodings which interpret the shared bit as part of the register specifier have the same opcode value as encodings of the instruction that interpret the shared bit as part of the immediate value.

In some implementations, the instruction decoder may support a number of different types of OIRFS instruction with opcode fields specifying different OIRFS-indicating opcode values, where each of those types of OIRFS instruction has the behaviour and encoding as described above. Hence, for any given one of those two or more types of OIRFS instruction having the opcode field specifying a given OIRFS-indicating opcode value, the instruction decoder may decode the at least one shared bit of the overlapped immediate/register field as either the immediate value, or the register specifier, or both the immediate value or the register specifier.

The instruction decoder and the processing circuitry may be part of a data processing apparatus. For example, the instruction decoder and processing circuitry may form part of a central processing unit (CPU) or a graphics processing unit (GPU). In many implementations, the instruction decoder and processing circuitry may be implemented as circuit logic in hardware, within a physical device.

However, it is also possible for a computer program to be provided which controls a host data processing apparatus to provide an instruction execution environment for simulating the execution of instructions of target program code written according to a given instruction set architecture. This can allow the target program code to execute on a host hardware platform which does not itself support the ISA for which the target program code was written. This can be useful for a number of reasons, such as for being able to execute legacy code written for one ISA on a newer device supporting a different ISA. Also, when developing software for a new version of an ISA being developed, before the corresponding hardware device which implements the new ISA is ready, it can be useful to test the software by executing it on a simulator which runs on a host data processing apparatus which does not itself support the new ISA for which the software is being tested. Hence, a computer program may be provided which comprises processing program logic and instruction program decoding program logic which emulates the functionality of the processing circuitry and the instruction decoder as discussed above. The registers of a physical hardware device could be emulated using a corresponding data structure in memory, by register emulating program logic. Alternatively, depending upon the architecture of the host, some simulators may use the physical registers in hardware within the host apparatus as the registers referenced by the instruction if these are compatible with the ISA being simulated. Either way, the instruction decoding program logic of such a simulator may support an OIRFS instruction which may be decoded and processed as discussed above.

FIG. 1 schematically illustrates an example of a data processing apparatus 2 (for example a CPU or GPU) which comprises processing circuitry 4 for performing data processing operations in response to instructions decoded by an instruction decoder 6. The instructions decoded by the instruction decoder 6 are fetched from a cache or memory by instruction fetch circuitry 8.

Based on the decoded instructions, the instruction decoder generates control signals to control the processing circuitry 4 to perform data processing operations represented by the instructions. Operands for the data processing operations are obtained from registers (selected as source registers), in a register file 10 comprising a certain number of registers. Results of the operations are written back to registers 10 (selected as destination registers) by the processing circuitry 4. For load/store instructions requesting that data from the cache or memory is loaded to the registers 10 or that data in the registers 10 is stored to the cache or memory, a load/store unit 12 may be instructed to carry out the load/store operation. It will be appreciated that FIG. 1 is a simplified example of a CPU or GPU 2 and that the CPU or GPU may include many other elements not shown in FIG. 1 for conciseness.

Figure 2:
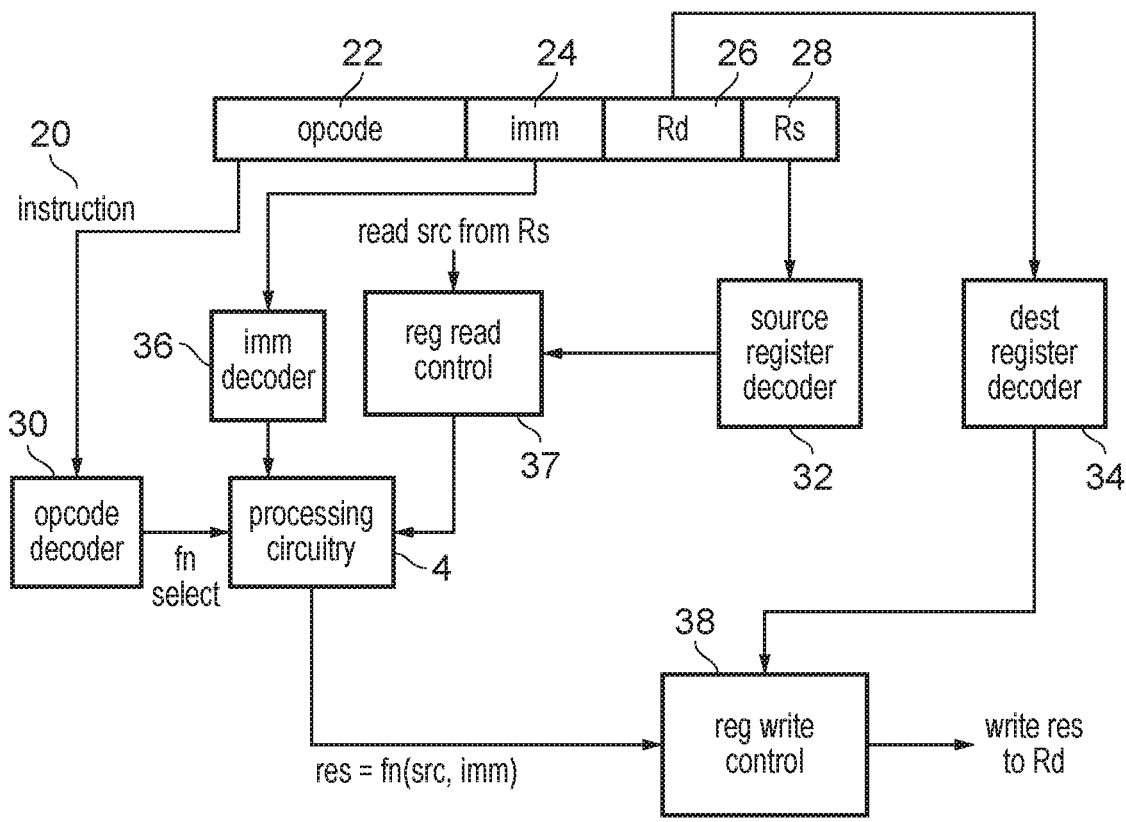
FIG. 2 shows, for comparison, an instruction in which an immediate value and a register specifier are encoded separately using separate non-overlapped fields of the instruction encoding.

FIG. 2 shows an example of an instruction 20 decoded by the instruction decoder 6, which includes a number of fields including an opcode field 22, an immediate field 24, a destination register field 26 and a source register field 28. The instruction decoder 6 comprises an opcode decoder 30, source register specifier decoder 32 and destination register specifier decode 34, and immediate value decoder 36. The opcode 22 is decoded by the opcode decoder 30 which, based on the decoded opcode, selects the particular processing function to be performed in response to the instruction. For example the opcode decoder 30 may generate control signals which activate different processing units within the processing circuitry depending on the value of the opcode.

The source register specifier 28 represents a source register to be selected from the register file 10 which is to provide a source operand src to be used for the processing operation. A source register decoder 32 selects the source register to be read, depending upon the value of the source register field 28. Register read control circuitry 37 may control the reading of the source operand from the source register Similarly, a destination register decoder 34 decodes the designation register field 26 to select which of the registers 10 is written with the result generated by the processing circuitry 4. Register write control circuitry 38 may control the writing of the result to the destination register.

The processing operation performed by the processing circuitry 4 also depends on the immediate value imm which is decoded by immediate value decoder 36 based on the immediate value field 24. For example, the immediate value could be a modifier for tweaking the processing function applied or for indicating a control parameter for the processing function to be performed. Also, in some cases the immediate value could be used as a numeric operand to be input to an arithmetic or logical operation to be combined with the source operand.

While FIG. 2 shows only a single source operand, other examples could have more than one source operand read from respective source registers. One of the source operands could in some cases be read from the destination register. In some implementations the physical register to be read as the source register or written as the destination register may be directly identified by the source or destination register specifiers 28, 26. However, some systems may support register renaming where the register specifiers 26, 28 in the instruction encoding 20 specify architectural registers, but the hardware has a set of physical registers 10 with a greater number of physical registers than the number of architectural registers that can be represented in the instruction encoding, and a register renaming unit remaps the architectural register specifiers specified in the instruction encoding 20 to the particular physical registers 10 which store the corresponding data. This can be useful to support out of order processing for example. Hence, it will be appreciated that there may be some indirection in mapping the register specifiers to the selection of the particular register to be read or written.

In the example of FIG. 2 the immediate value field 24 is entirely separate from the register specifier fields 26, 28, with no sharing of bits between the immediate value and register specifiers.

Figure 3:
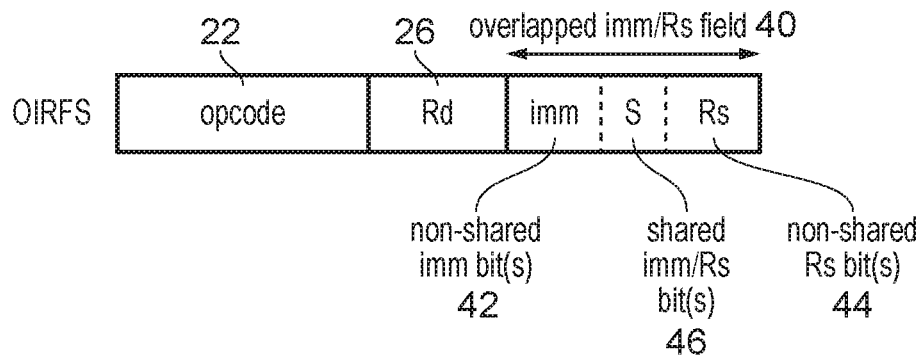
FIG. 3 shows an example of an instruction with an overlapped immediate/register specifier field.

FIG. 3 shows an approach where, while the destination register specifier field 26 is still distinct from the immediate value field, the immediate and source register specifier fields 24, 28 are replaced with an overlapped immediate/register specifier field 40 which identifies both the immediate value and the source register specifier. The overlapped immediate/register specifier field 40 includes one or more non-shared immediate bits 42 which represent part of the immediate value only, one or more non-shared register specifying bits 44 which represent part of the register specifier only, and one or more shared bits 46 which, among the different encodings of the instruction all sharing the same value for the opcode 22, can identify bits of the immediate value for some encodings and bits of the register specifier for some encodings. Hence, this instruction is an OIRFS instruction as discussed above which overlaps the immediate and register specifier fields so as to share at least one bit between them. This can allow an immediate value with a certain number of bits and a register specifier with a certain number of bits to be represented using a number of bits less than the sum of the number of bits in the immediate value and the register specifier respectively. While FIG. 3 (for sake of example) shows the source register specifier field being encoded as overlapped with immediate value, the same technique could be applied to the destination register specifier field 26 instead. Also, it will be appreciated that the relative bit positions of the shared bits 46 compared to the non-shared bits 42, 44 within the instruction encoding is arbitrary, and so in other examples the shared bits 46 could be located at a different part of the instruction encoding.

Figure 4:
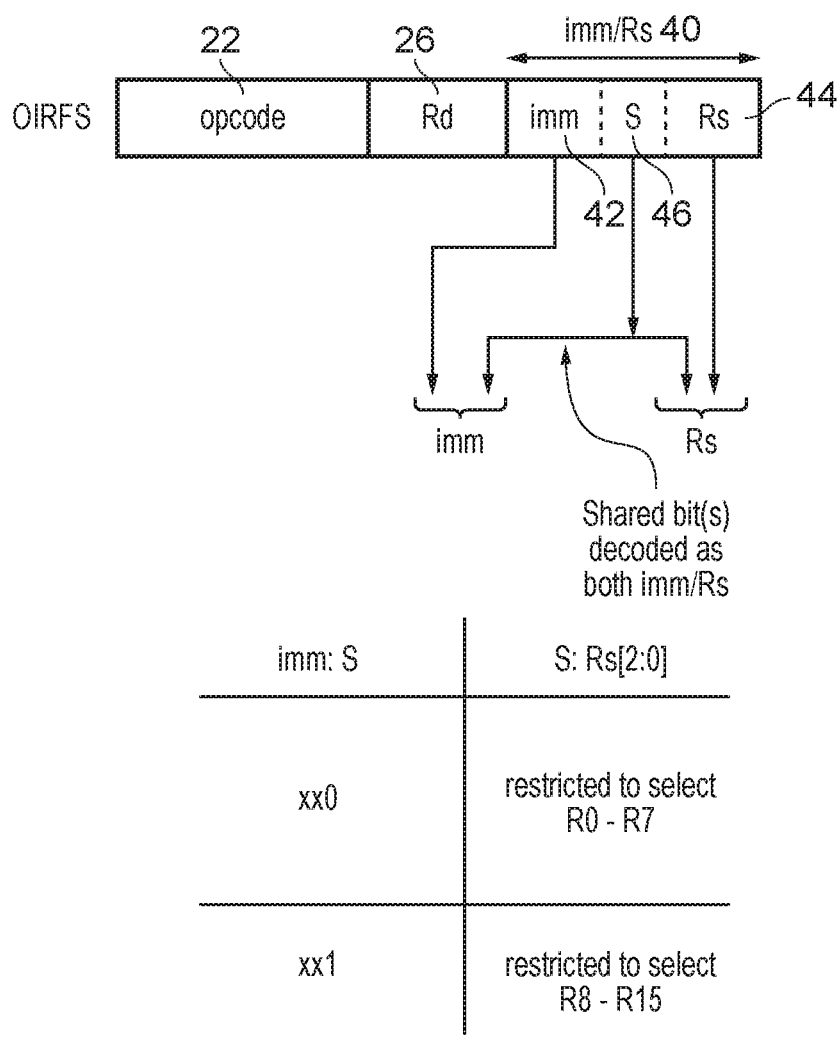
FIG. 4 shows a first example where one or more shared bits of the overlapped immediate/register specifier field are decoded both as part of the immediate value and as part of the register specifier.

FIG. 4 shows a first example of the decoding of the OIRFS instruction by the instruction decoder 6. The opcode decoder 30, register decoders 32, 34 and immediate value decoder 36 are not shown in FIG. 4 for conciseness, but may be provided. In the example of FIG. 4, the shared bits 46 of the overlapped immediate/register specifying field 40 are decoded as both part of the immediate value and part of the register specifier, so that some bits of the immediate value are forced to be the same as corresponding bits in the register specifier (the corresponding bits in the immediate value and register specifier need not be at the same relative bit positions within these values). For example, if there is a single shared bit S, two non-shared immediate value bits, and three non-shared register specifier bits 44, then this permits a selection from a set of 16 registers and selection from a set of 8 immediate values to be encoded using only 6 bits in the overlapped immediate/register field 40 in total. As shown in the table at the bottom of FIG. 4, the selection of the immediate value imm (formed from the combination of the non-shared immediate bit(s) 42 and the shared bit(s) 46) imposes a restriction on which registers can be selected using the register specifier represented by the combination of the shared bit(s) 46 and the non-shared register specifier bit(s) 44. For example, for values of the immediate value imm which have a least significant bit of 0, then this bit of 0 in the shared bit also forms the most significant bit of the register specifier, and so the source register may be restricted to being selected from the subset of registers R0 to R7, with registers R8 and R15 being unavailable for selection for the OIRFS encodings with the least significant immediate value bit set to 0. Similarly, encodings of an OIRFS instruction with the same opcode but with the immediate value having a least significant bit of 1 may be restricted to selecting their source registers from the subset of registers R8 to R15. Hence, encodings with a least significant immediate value bit of 0 but a source register of R8 to R15 are invalid, and encodings with a least significant immediate value bit of 1 and register specifiers in the range R0 to R7 are also invalid. Compilers will need to be aware of this restriction when choosing which registers to use to store the operands for instructions depending upon which immediate value will be specified. Nevertheless, by reducing by 1 the number of bits needed in the combined immediate value/register specifier field 40, this frees up an extra bit which could be used for the opcode 22 instead to increase a number of different processing operations that can be represented.

Figure 5:
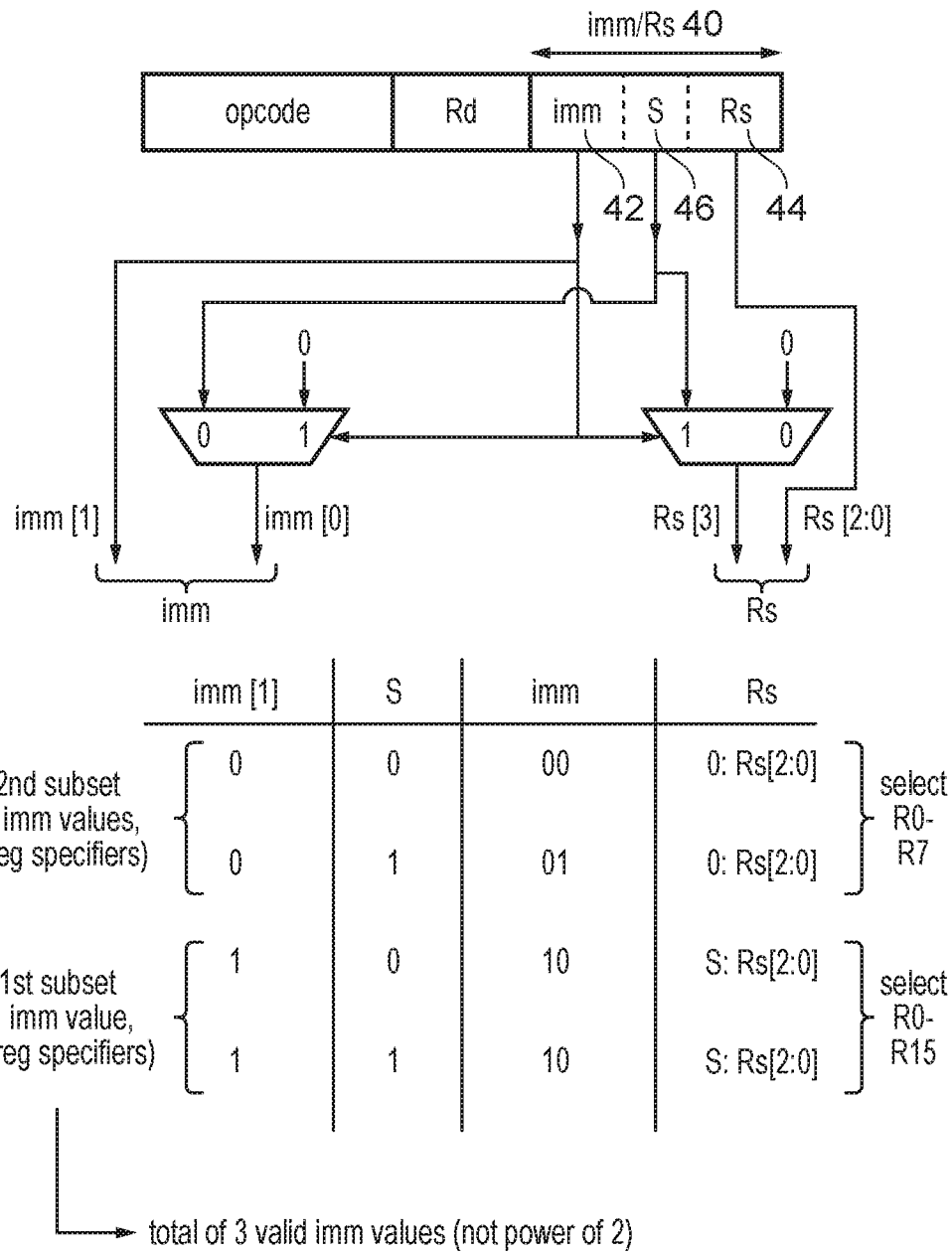
FIG. 5 shows a second example where the instruction decoder selects whether to interpret one or more shared bits as either part of the immediate value or part of the register specifier.

FIG. 5 shows a second example of the OIRFS instruction where this time the instruction decoder includes selection circuitry 50 for selecting which of the immediate value and the register specifier should be decoded based on the shared bit 46. For example the selection may be based on one of the non-shared bits 42 of the immediate value.

In this example there is a single non-shared immediate bit 42, labelled imm[1], and the least significant bit imm[0] is a shared bit decoded selectively as either the least significant bit of the immediate value or the most significant bit of the register specifier.

When the most significant immediate bit imm[1] is 0, then the upper bit Rs[3] of the register specifier is clamped to 0 to restrict the selection of registers to registers R0 to R7 and the shared bit encodes the least significant bit of the immediate value. If the most significant bit of the immediate value imm[1] is 1 then the upper bit Rs[3] of the register specifier is selected based on the shared bit S and so the full set of 16 registers R0 to R15 is available for selection, and the lower immediate value bit imm[0] is clamped to 0.

Hence, with this approach the different encodings of the OIRFS instruction having the same value for the opcode 22 can be divided into a first subset of encodings 60 which support a smaller number of immediate values (only supporting one possible immediate value 0b10 in this example) but support a larger number of register specifiers (16 in this example) and a second subset 62 of encodings which have a greater number of immediate values (2 in this example) and a smaller number of register specifiers (8). Hence, J=1, K=16, L=2, and M=8. Note that this means that the total number of valid immediate values is 3, which is not an exact power of 2. Hence, this approach can be useful to allow additional registers to be selected in cases where the number of possible immediate values to be encoded is not an exact power of 2.

It will be appreciated that FIGS. 4 and 5 are just some examples, and the number of bits in the respective portions 42, 44, 46 of the overlapped immediate/register specifier field could be varied. Also, the way in which the shared bits are interpreted as part of the immediate value and the register specifier could be varied, for example if the shared bit in FIG. 4 was interpreted as the least significant bit of the register specifier instead of the most significant bit, then this would change the respective subsets of registers which would be accessible by each of the subsets of encodings sharing the same opcode.

Figure 6:
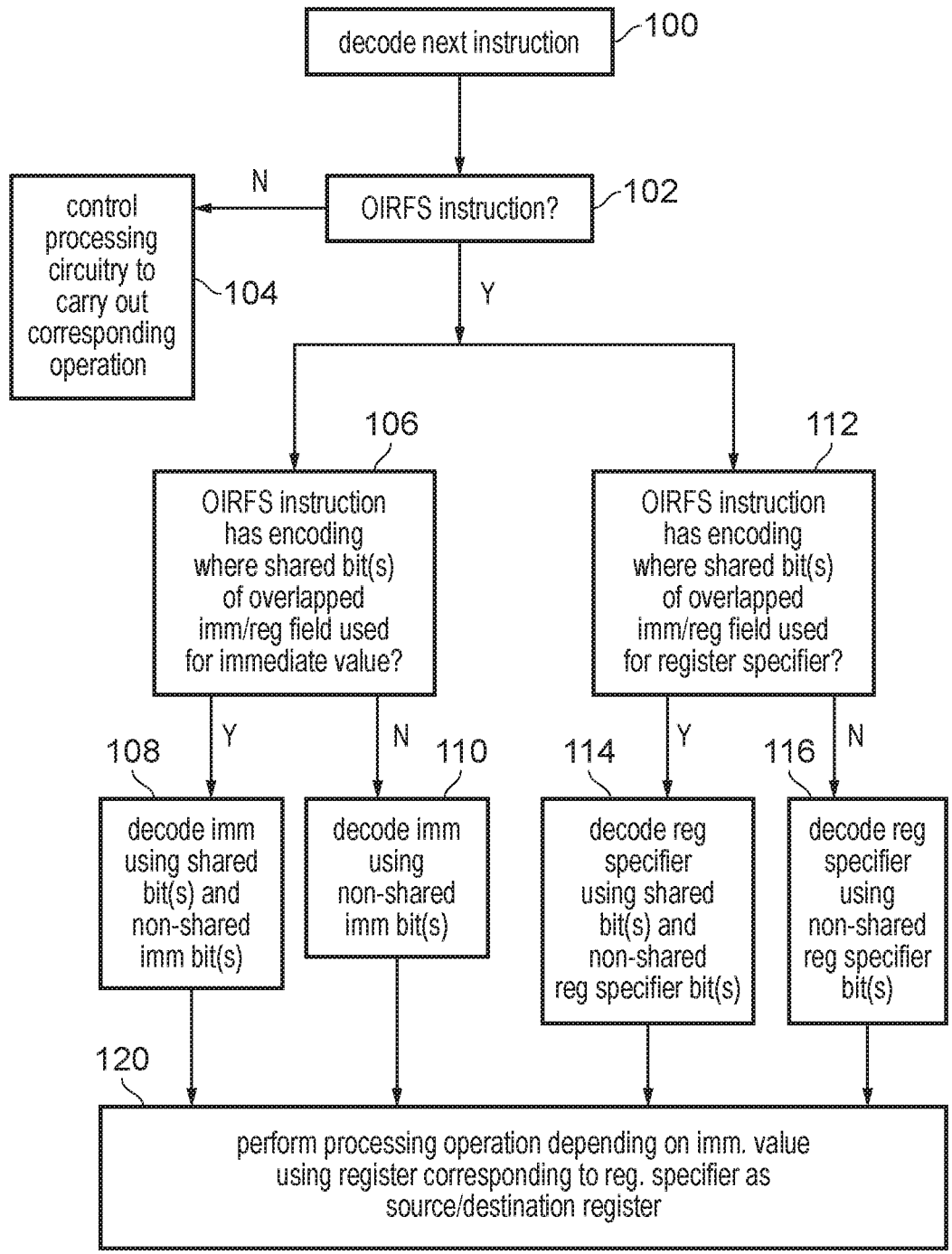
FIG. 6 is a flow diagram showing a method of decoding instructions to control data processing.

FIG. 6 is a flow diagram showing a method of controlling instruction decoding. At step 100 the instruction decoder 6 decodes the next instruction and at step 102 the instruction decoder 6 determines whether the instruction is an OIRFS instruction. If not, then at step 104 the processing circuitry 4 is controlled to carry out a corresponding processing operation as represented by the non-OIRFS instruction. It will be appreciated that at step 102 the instruction may be identified as an OIRFS instruction when the opcode 22 of the instruction matches one of a set of one or more OIRFS-indicating values designated for representing OIRFS instructions. In some cases there may only be a single type of OIRFS instruction supported in the instruction set. Other examples may support multiple types of OIRFS instructions, which request that different types of processing operation are performed on the operand and immediate value, but which, for any one given type, include encodings having the same opcode but different values for remaining bits which can have one or more shared bits interpreted as either one of the immediate value or the register specifier or both.

Hence, when an OIRFS instruction is identified, then at step 106 the instruction decoder 6 determines whether the OIRFS instruction has an encoding for which the shared bits of the overlapped immediate/register specifier field should be used to provide the immediate value. If so, then at step 108 the immediate value is decoded using the shared bits 46 and the non-shared immediate bits 42. If the OIRFS instruction has an encoding for which the shared bits 46 are not to be used for representing the immediate value (such as for the first subset of encoding 60 shown in FIG. 5) then at step 110 the instruction decoder 6 decodes the instruction to obtain the immediate value imm using only the non-shared immediate value bits 42.

Meanwhile, at step 112, the instruction decoder also determines whether the OIRSF instruction has an encoding where the shared bits 46 of the overlapped immediate/register specifier field are to be used to encode part of a register specifier. If so, then at step 114 the instruction decoder 6 decodes the register specifier of a source register or a destination register (or a register which acts as both source and destination) using both the shared bits 46 of the overlapped immediate/register field 40 and the non-shared register specifier bits 44. If the OIRFS instruction has an encoding where the shared bits of the overlapped immediate/register field are not to be used for the register specifier, such as for the second subset of encoding 62 shown in FIG. 5, then at step 116, the instruction decoder decodes the register specifier using only the non-shared register specifier bits 44. It will be appreciated that at steps 114, 116 the register specifier value obtained by the decoder may then further be remapped using register renaming to select the actual register to be read or written.

Note that in the example of FIG. 4 steps 108 and 114 will both be performed for the same instruction, as the shared bits are used to represent both immediate value and register specifier for a single encoding of the OIRFS instruction. Hence, for the approach in the FIG. 4, steps 110 and 116 would not be performed.

On the other hand, with the approach shown in FIG. 5, then for any one instruction encoding either step 108 and step 116 will be performed or step 110 and step 114 will be performed, but the shared bits are not used for both immediate value and registers specifier in the same instruction. Nevertheless, the instruction encoding for the OIRFS instruction (for which step 108 is performed) and the instruction encoding for the OIRFS instruction (for which step 114 is performed) both share exactly the same value for the opcode field 22 (these are not different instruction types represented by different opcodes).

Regardless of how the immediate value and the register specifier are decoded, then at step 120 the instruction decoder generates the control signals to control the processing circuitry 4 to perform the processing operation identified by the opcode 22 depending upon the immediate value obtained at one of steps 108 and 110, using the register selected based on the register specifier identified at one of steps 114, 116 as either a source or destination register for the processing operation.

Figure 7:
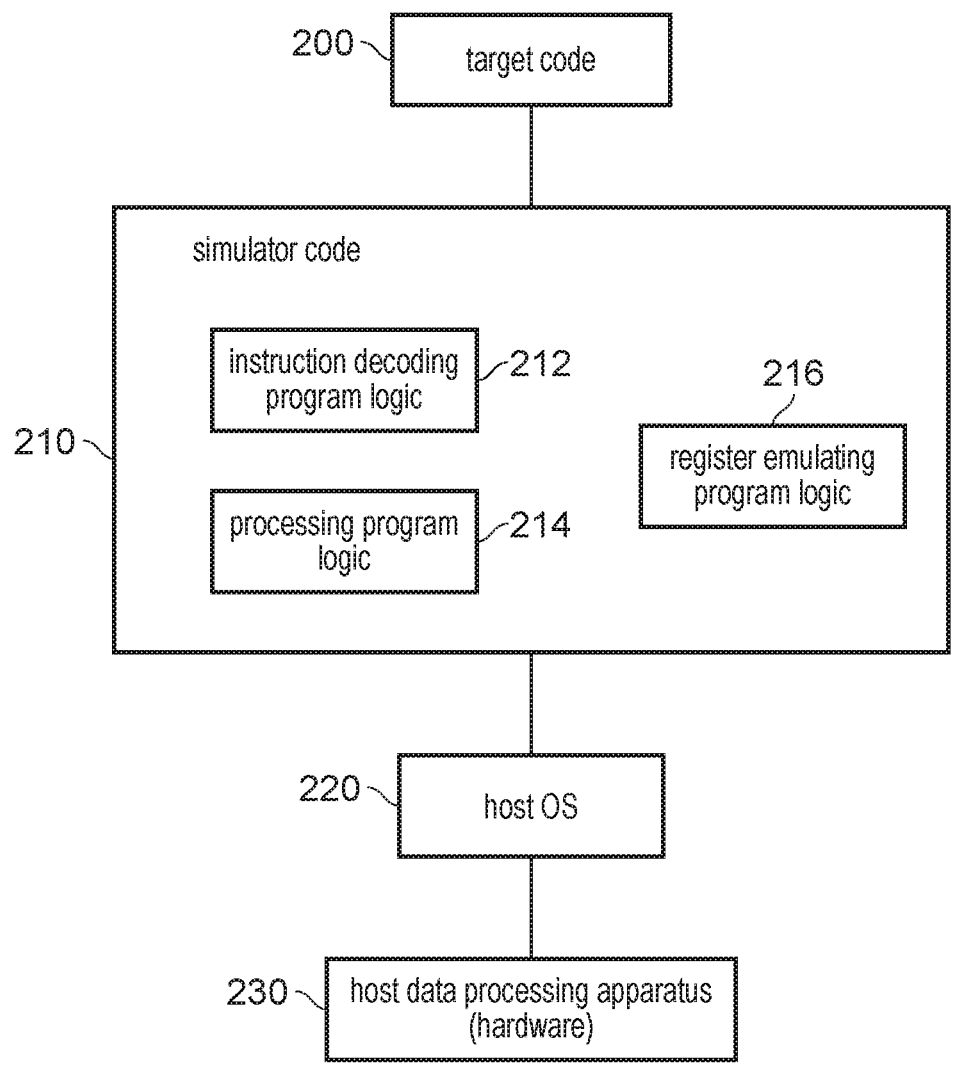
FIG. 7 shows a simulator example which may be used.

FIG. 7 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200, including OIRFS instructions as described above, may be executed from within the instruction execution environment using the simulator program 210, so that a host computer 230 which does not actually have the hardware features of the apparatus 2 discussed above can emulate these features. The simulator program 210 includes instruction decoder program logic 212 for decoding instructions of the target code 200 and controlling processing program logic 214 to perform corresponding processing operations using operands stored in a register emulating data structure maintained by register emulating program logic 216 to mirror the registers 10 which would be provided in a real hardware apparatus supporting the same ISA.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to perform data processing;
an instruction decoder to decode instructions to generate control signals to control the processing circuitry to perform the data processing; and
a plurality of registers; in which:
in response to an overlapped-immediate/register-field-specifying (OIRFS) instruction comprising an opcode field specifying an OIRFS-indicating opcode value, and an overlapped immediate/register field specifying an immediate value and a register specifier, the instruction decoder is configured to control the processing circuitry to use a selected register of the plurality of registers corresponding to the register specifier as a source register or destination register when performing a processing operation depending on the immediate value; and
said overlapped immediate/register field includes at least one shared bit for which:
for at least one encoding of the OIRFS instruction having the opcode field specifying said OIRFS-indicating opcode value, the instruction decoder is configured to decode said at least one shared bit as part of the immediate value; and
for at least one encoding of the OIRFS instruction having the opcode field specifying said OIRFS-indicating opcode value, the instruction decoder is configured to decode said at least one shared bit as part of the register specifier.

2. The apparatus according to claim 1, in which, for an encoding of the OIRFS instruction having the opcode field specifying said OIRFS-indicating opcode value:
when the immediate value is a first immediate value, the register specifier specifies said selected register as one of a first subset of the plurality of registers; and
when the immediate value is a second immediate value different to the first immediate value, the register specifier specifies said selected register as one of a second subset of the plurality of registers different to the first subset.

3. The apparatus according to claim 2, in which the first subset and the second subset comprise different non-overlapping subsets of the plurality of registers.

4. The apparatus according to claim 2, in which the first subset and the second subset comprise different overlapping subsets of the plurality of registers.

5. The apparatus according to claim 1, in which in response to the OIRFS instruction, the instruction decoder is configured to decode said at least one shared bit both as part of the immediate value and as part of the register specifier.

6. The apparatus according to claim 5, in which at least one register selectable as the selected register for an encoding of the OIRFS instruction specifying a first immediate value is not selectable as the selected register for an encoding of the OIRFS instruction specifying a second immediate value.

7. The apparatus according to claim 1, in which the instruction decoder is configured to select, based on a part of an instruction encoding of the OIRFS instruction other than the opcode field, whether to decode said at least one shared bit as part of the immediate value or as part of the register specifier.

8. The apparatus according to claim 7, in which said part of the instruction encoding comprises at least one non-shared bit of the immediate value.

9. The apparatus according to claim 1, in which an encoding of the overlapped immediate/register field represents the immediate value as one of a set of N unique valid immediate values; and
N is an integer other than an exact power of 2.

10. The apparatus according to claim 1, in which:
for a first subset of encodings of the OIRFS instruction specifying the OIRFS indicating opcode value, an encoding of the overlapped immediate/register field represents the immediate value as one of a set of J unique valid immediate values and represents the register specifier as one of a set of K unique valid register specifiers;
for a second subset of encodings of the OIRFS instruction specifying the same value of the OIRFS-indicating opcode value as the first subset of encodings, an encoding of the overlapped immediate/register field represents the immediate value as one of a set of L unique valid immediate values and represents the register specifier as one of a set of M unique valid register specifiers;

J<L; and
K>M.

11. The apparatus according to claim 1, in which the OIRFS instruction also specifies a non-overlapped register field specifying a further register specifier identifying one of said plurality of registers as a further selected register to use as a source register or destination register in the processing operation; and
 the instruction decoder is configured to decode the non-overlapped register field based on non-shared bits of the non-overlapped register field.

12. The apparatus according to claim 1, in which the instruction decoder is configured to support a plurality of types of OIRFS instruction with opcode fields specifying different OIRFS-indicating opcode values; and
 for a given one of said plurality of types of OIRFS instruction having the opcode field specifying a given OIRFS-indicating opcode value:
  for at least one encoding of the OIRFS instruction having the opcode field specifying said given OIRFS-indicating opcode value, the instruction decoder is configured to decode said at least one shared bit as part of the immediate value; and
  for at least one encoding of the OIRFS instruction having the opcode field specifying said given OIRFS-indicating opcode value, the instruction decoder is configured to decode said at least one shared bit as part of the register specifier.

13. The apparatus according to claim 1, in which the instruction decoder and the processing circuitry are part of a central processing unit (CPU).

14. The apparatus according to claim 1, in which the instruction decoder and the processing circuitry are part of a graphics processing unit (GPU).

15. A data processing method for an apparatus comprising processing circuitry to perform data processing, an instruction decoder to decode instructions to generate control signals to control the processing circuitry to perform the data processing, and a plurality of registers; the method comprising:
 the instruction decoder decoding an overlapped-immediate/register-field-specifying (OIRFS) instruction comprising an opcode field specifying an OIRFS-indicating opcode value, and an overlapped immediate/register field specifying an immediate value and a register specifier; and
 in response to the OIRFS instruction, the instruction decoder controlling the processing circuitry to use a selected register of the plurality of registers corresponding to the register specifier as a source register or destination register when performing a processing operation depending on the immediate value; in which:
 said overlapped immediate/register field includes at least one shared bit for which:
  for at least one encoding of the OIRFS instruction having the opcode field specifying said OIRFS-indicating opcode value, the instruction decoder decodes said at least one shared bit as part of the immediate value; and
  for at least one encoding of the OIRFS instruction having the opcode field specifying said OIRFS-indicating opcode value, the instruction decoder decodes said at least one shared bit as part of the register specifier.

16. A non-transitory storage medium storing a computer program for controlling a host data processing apparatus to provide an instruction execution environment for execution of instructions of target program code; the computer program comprising:
 processing program logic to perform data processing; and
 instruction decoding program logic to decode instructions of the target program code to control the processing program logic to perform the data processing with reference to a register providing data structure representing a plurality of registers; in which:
 in response to an overlapped-immediate/register-field-specifying (OIRFS) instruction comprising an opcode field specifying an OIRFS-indicating opcode value, and an overlapped immediate/register field specifying an immediate value and a register specifier, the instruction decoding program logic is configured to control the processing program logic to perform a processing operation depending on an immediate value, using a selected register of the plurality of registers corresponding to the register specifier as a source register or destination register; and
 said overlapped immediate/register field includes at least one shared bit for which:
  for at least one encoding of the OIRFS instruction having the opcode field specifying said OIRFS-indicating opcode value, the instruction decoding program logic is configured to decode said at least one shared bit as part of the immediate value; and
  for at least one encoding of the OIRFS instruction having the opcode field specifying said OIRFS-indicating opcode value, the instruction decoding program logic is configured to decode said at least one shared bit as part of the register specifier.

* * * * *